(12) United States Patent
Nainar et al.

(10) Patent No.: US 11,025,534 B2
(45) Date of Patent: Jun. 1, 2021

(54) SERVICE-BASED NODE-CENTRIC ECMP HEALTH

(71) Applicant: Cisco Technology, Inc., San Jose, CA (US)

(72) Inventors: Nagendra Kumar Nainar, Morrisville, NC (US); Carlos M. Pignataro, Cary, NC (US); Benoit Claise, Othée (BE)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/601,944

(22) Filed: Oct. 15, 2019

(65) Prior Publication Data

US 2021/0111992 A1    Apr. 15, 2021

(51) Int. Cl.
*H04L 12/709*  (2013.01)
*H04L 12/26*   (2006.01)
*H04L 12/803*  (2013.01)
*H04L 12/721*  (2013.01)

(52) U.S. Cl.
CPC ............ *H04L 45/245* (2013.01); *H04L 43/12* (2013.01); *H04L 45/70* (2013.01); *H04L 47/125* (2013.01)

(58) Field of Classification Search
None
See application file for complete search history.

(56) References Cited

U.S. PATENT DOCUMENTS

| | | | |
|---|---|---|---|
| 8,170,022 B2 | 5/2012 | Tychon et al. | |
| 9,432,245 B1 * | 8/2016 | Sorenson, III | H04L 47/125 |
| 9,559,961 B1 * | 1/2017 | Sorenson, III | H04L 43/00 |
| 9,843,520 B1 * | 12/2017 | Haltore | H04L 47/125 |
| 10,158,556 B2 | 12/2018 | Iqbal et al. | |
| 2006/0218279 A1 | 9/2006 | Yamaguchi et al. | |
| 2014/0310418 A1 * | 10/2014 | Sorenson, III | H04L 67/288 |
| | | | 709/226 |

(Continued)

FOREIGN PATENT DOCUMENTS

| | | |
|---|---|---|
| EP | 2472784 A1 | 7/2012 |
| WO | 2016089921 A1 | 6/2016 |

OTHER PUBLICATIONS

Pinkham. "ECMP Monitoring 101: Increase resiliency without losing visibility," published May 9, 2019 at <https://www.appneta.com/blog/ecmp-monitoring-101-increase-resiliency-without-losing-visibility/> (Year: 2019).*

(Continued)

*Primary Examiner* — Scott B Christensen
(74) *Attorney, Agent, or Firm* — Edell, Shapiro & Finnan, LLC

(57) ABSTRACT

Techniques are presented herein for determining equal cost multi-path (ECMP) performance health in a network. In accordance with an example embodiment, a method is provided that involves obtaining information indicating ECMP paths in a network, the network comprises of a plurality of nodes that includes at least one branch node. The method includes configuring the branch node to obtain ECMP performance metrics, and obtaining the ECMP performance metrics from the branch node. The method further includes analyzing the ECMP performance metrics to determine ECMP performance health of the branch node.

20 Claims, 10 Drawing Sheets

(56) References Cited

U.S. PATENT DOCUMENTS

| | | | | |
|---|---|---|---|---|
| 2015/0146575 | A1* | 5/2015 | Singh | H04L 45/16 370/256 |
| 2016/0182380 | A1* | 6/2016 | Mehra | H04L 45/7453 709/226 |
| 2016/0197853 | A1* | 7/2016 | Kumar | H04L 43/10 370/389 |
| 2018/0062991 | A1 | 3/2018 | Nainar et al. | |
| 2018/0176134 | A1 | 6/2018 | Pignataro et al. | |
| 2018/0307712 | A1 | 10/2018 | Baradaran et al. | |
| 2018/0331947 | A1* | 11/2018 | James | H04L 45/124 |
| 2019/0081882 | A1 | 3/2019 | Iqbal et al. | |
| 2019/0182155 | A1* | 6/2019 | Chang | H04L 61/251 |
| 2019/0319872 | A1* | 10/2019 | Adhikari | H04L 43/08 |
| 2019/0386918 | A1* | 12/2019 | Iyer | H04L 41/12 |

OTHER PUBLICATIONS

"Segment Routing and Path Computation Element," posted at <https://www.tmcnet.com/tmc/whitepapers/documents/whitepapers/2015/11525-segment-routing-path-computation-element-using-traffic-engineering.pdf> on Oct. 2015 (Year: 2015).*

Levine, Matt, "A simple pattern to do weighted ECMP + health checking for load balancing on JunOS using Linux & Quagga", https://medium.com/cachefly/a-simple-pattern-to-do-weighted-ecmp-health-checking-for-load-balancing-on-lunos-using-linux-7456f9fefcf3, Aug. 14, 2018, 6 pages.

Micro Focus, "Network Node Manager i", Data Sheet IT Operations Management, Sep. 2019, 9 pages.

Brockners, Frank, "Always on visibility: In-band OAM for IPv6", downloaded Sep. 30, 2019, BRKRST-2606, 84 pages.

Mandal, Kingshuk, "Validating Equal-Cost Multi-Path (ECMP) at Scale", Feb. 26, 2018, 6 pages.

Cisco, "ECMP Load Balancing", MPLS: Layer 3 VPNs Configuration Guide, Cisco IOS XE Release 3S (Cisco ASR 900 Series), downloaded Sep. 30, 2019, 12 pages.

Cisco, "A Need for Multiprotocol Label Switching Operation Administration Maintenance", Jun. 2007, 14 pages.

Cisco, "Intent-Based Networking", White paper Cisco public, C11-740210-00, Jan. 2018, 11 pages.

International Search Report and Written Opinion in counterpart International Application No. PCT/US2020/054993, dated Nov. 30, 2020, 14 pages.

Versa, "Versa FlexVNF", Versa Networks, Santa Clara, CA, Jan. 2017, 4 pages.

Pfister, Pierre et al., "Techniques for Efficient and Consistent Hashing With Optimal Fairness for Flow Distribution and Load-Balancing", Technical Disclosure Commons, Jan. 9, 2019, 4 pages.

Huawei, "Understanding the Hash Algorithm", Huawei Technologies Co., Ltd., Issue 01, Jun. 28, 2019, 8 pages.

* cited by examiner

SERVICE-BASED NODE-CENTRIC ECMP HEALTH

TECHNICAL FIELD

The present disclosure relates to service assurance in a network.

BACKGROUND

Equal Cost Multi-Path (ECMP) is often used in a network for efficient load balancing and network resiliency. In an ECMP network environment, path selection may be made by a node based on a local hashing mechanism that considers various key values from the packet header (such as Internet Protocol (IP) header information, Internet Protocol version 6 (IPv6) flow label, entropy labels, etc.) and local variables (incoming interface identifier, loopback address, etc.). ECMP performs load balancing based on the packet flow, not based on the individual packets.

Depending on the network design and deployment model, the number of ECMP paths between endpoints may vary between two to several hundreds or even thousands. Even more ECMP paths may result from multiple node local ECMP decisions, also known as "cascaded ECMP".

DESCRIPTION OF EXAMPLE EMBODIMENTS

Overview

Figure 1:
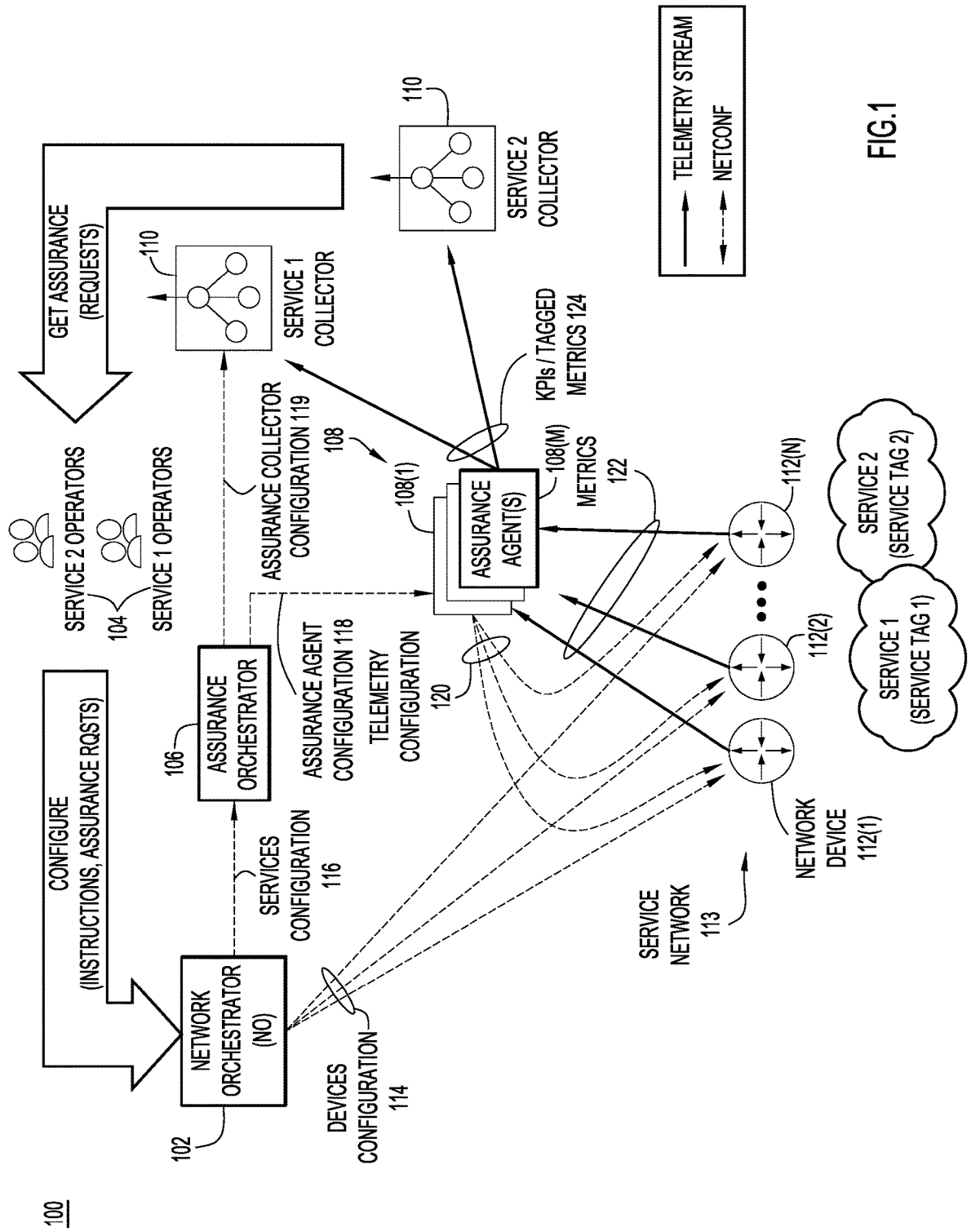
FIG. 1 is a block diagram of a system configured for assurance of services in a network, according to an example embodiment.

Techniques are presented herein for determining Equal Cost Multi-Path (ECMP) performance health in a network. In accordance with an example embodiment, a method is provided that involves obtaining information indicating ECMP paths in a network, the network comprises of a plurality of nodes that includes at least one branch node. The method includes configuring the branch node to obtain ECMP performance metrics, and obtaining the ECMP performance metrics from the branch node. The method further includes analyzing the ECMP performance metrics to determine ECMP performance health of the branch node.

EXAMPLE EMBODIMENTS

Service assurance involves monitoring performance of network services. ECMP assurance is a use case that network operators are interested to monitor/assure. Based on the granularity, the health of the ECMP path can be gauged in two ways:

Network-centric (End-to-End ECMP paths between two service endpoints); and

Node-centric (ECMP for a prefix on any particular node).

The intention of node-centric ECMP health assurance is to ensure that:

All ECMP paths are installed in the Routing Information Base (RIB)/Forwarding Information Base (FIB)/Label Forwarding Information Base (LFIB) table;

All ECMP paths are healthy; and

All ECMP paths are utilized without any flow polarization.

Network users desire assurance that ECMP is healthy for a Prefix P (or Label L). Monitoring the uptime/status of Prefix P in the FIB table may not be sufficient for the several reasons. One such reason is that changes at Layer 2 (L2) are not reflected in the forwarding table. For example, Prefix P uses PortChannel on an egress interface and if one of the member links of the PortChannel goes down, it may not be reflected in the forwarding table. As another example, Prefix P uses PortChannel1 and PortChannel2 on egress interfaces and if one of the member links of PortChannel 1 goes down, it may not be reflected in the Internet Protocol (IP) forwarding table.

Another reason ECMP assurance is useful is that there may be an inconsistency between the RIB, FIB, LFIB, and hardware FIB (HW-FIB) that may result in providing the wrong health status. Still another reason is that an interface staying up does not guarantee that the forwarding status of all the interfaces are operating properly. An interface may have some random drops (due to a linecard/hardware issue) while other interfaces are not experiencing any such packet drops.

Furthermore, monitoring the cumulative load distribution between ECMP links may not be sufficient for the various reasons. One reason may be that Prefix P1 is reachable via interface 1 (Intf1) and interface 2 (Intf2) while Prefix P2 is reachable via Intf2 and interface 3 (Intf3). It is natural to see Intf2 loaded more than Intf1 and Intf3.

Still another reason may be that there is a certain number (e.g., 10) of mice flow to Prefix P1 (at a rate of 100 Kbps) and one elephant flow to the same prefix P1 (at a rate of 10 Mbps) which will not show 50-50 load sharing at the packet level. It is expected to see a few Mbps in one link while just a few kbps in other.

Thus, it is desirable to assure that ECMP on a per-node basis is healthy. Again, the intention of node-centric ECMP health assurance is to ensure that:

All ECMP paths/links are installed in the RIB/FIB/LFIB table;

All ECMP paths/links are healthy and stable;

All ECMP paths/links are forwarding without any issues; and

All ECMP paths are utilized without any flow polarization.

From a load balancing point of view, there are numerous operational challenges. Traffic may not be load balanced properly: one particular link is utilized completely while another link is utilized only a small amount. This is the aforementioned flow polarization problem that is observed in many networks and operators want to solve this problem. Another challenge could be that there are two links over which ECMP is employed, and one link is very healthy whereas the other link is dropping packets. All the flows load balanced to the healthy link will be fine, but the flows load balanced to the unhealthy link will suffer performance issues. There are many such issues that, depending on the granularity, impact the ECMP service assurance.

Presented herein are methods for monitoring per-node (node-centric) ECMP health and achieving load assurance. These methods use a combination of link health, monitoring and sampling-based statistics to provide a unified view of ECMP health on a per-prefix/label basis for service assurance. These techniques employ knowledge about the control plane, data plane and forwarding behavior, to provide an answer of "healthy", "not healthy" or "maybe healthy". ECMP health can be measured in terms of equal load sharing, stability, etc., as described further herein.

The method involves querying a node about the health of ECMP on a per-prefix or per-label basis. Analysis is performed on the data returned by the node to make the determination as to whether the ECPM is healthy or not healthy on that node.

Referring now to FIG. 1, a diagram is shown of a service assurance system 100 according to an example embodiment. With reference to FIG. 1, there is a block diagram of an example network service assurance system or architecture (also referred to herein as a "service assurance system" 100). Service assurance system 100 may provide service assurance for and intent-based network, for example. The service assurance system 100 leverages programming capabilities of network devices in the intent-based network (also referred to as a "service network" or simply a "network"), and model/event driven telemetry from the network devices, to deliver end-to-end service assurance for various services. Assurance system 100 includes a network orchestrator (NO) 102, service operators 104 to provide instructions to the NO 102, an assurance orchestrator 106 that communicates with the NO 102, assurance agents 108(1)-108(M) (collectively, assurance agents 108) that communicate with the assurance orchestrator 106, assurance collectors 110 (also referred to as assurance collectors 110) that communicate with the assurance agents 108 and the service operators 104, and network devices 112(1)-112(N) (collectively, network devices 112) that communicate with the NO 102 and the assurance collectors 110. NO 102 configures network devices 112(1)-112(N) to implement an intent-based service network 113 enabled to provide a variety of services to end users. Network devices 112 (nodes) may include routers, switches, gateways, and other network devices (physical or virtual). Assurance orchestrator 106, assurance agents 108, and assurance collectors 110 are generally referred to as one or more "assurance entities."

NO 102 may include applications and/or services hosted on one or more server devices (more simply referred to as servers), for example, in a cloud-based data center. Assurance orchestrator 106 may also include applications and/or services hosted on one or more server devices, which may be the same as or different from the servers used by NO 102. Similarly, assurance collectors 110 may also include applications and/or services hosted on one or more servers, which may be the same as or different from the servers used by assurance orchestrator 106. Assurance agents 108(1)-108(N) may each include applications and/or services hosted on one or more servers, and may be distributed geographically to be near respective ones of network devices 112(1)-112(N) enabled for services to be monitored under control of the assurance agents. NO 102, assurance orchestrator 106, assurance agents 108, assurance collectors 110, and network devices 112 may communicate with each other over one or more communication networks, including one or more wide area networks (WANs), such as the Internet, and one or more local area networks (LANs).

In the example of FIG. 1, service assurance system 100 supports multiple services, including service 1 and service 2 (collectively, "the services"). To this end, service operators 104 include a service 1 operator for service 1 and a service 2 operator for service 2, and assurance collectors 110 include a service 1 collector for service 1 and a service 2 collector for service 2. Service operators 104 (e.g., service 1 operator and service 2 operator) provide to NO 102 network and service intent-based instructions to setup/configure the services (e.g., service 1 and service 2) for end users. Service operators 104 also receive requests for assurance (e.g., "get assurance" requests) for the services from assurance collectors 110 (e.g., service 1 collector and service 2 collector), and forward the requests to NO 102.

Responsive to the aforementioned instructions and the requests sent by service operators 104, NO 102 derives and sends to network devices 112 intent-based network device configuration information 114 to configure the network devices/service network 113 for the services (e.g., for service 1 and service 2). In addition, NO 102 derives and sends to assurance orchestrator 106 service configuration information 116 for providing assurance for the services (e.g., service 1 and service 2) enabled on service network 113. Service configuration information 116 includes, for each service deployed or implemented on service network 113, respectively, a definition of the service, including a service type (e.g., a type of network connectivity), a service instance (e.g., an identifier or name of the service), and network configuration information that describes how the service is actually implemented of service network 113. That is, the definition of the configuration of the service is reflective of how the service is instantiated as a collection of the subservices in service network 113.

For network device configuration information 114, NO 102 may employ, for example, the Network Configuration Protocol (NETCONF) to push intent-based network device configuration objects, such as Yet Another Next Generation (YANG) models or objects, to network devices 112. Similarly, for services configuration information 116, NO 102 may also employ, for example, NETCONF to push intent-based service configuration YANG objects to assurance orchestrator 106. YANG is a data modeling language used to define data sent over a NETCONF compliant network to configure resources. NETCONF is used to install, manipulate, and delete configurations of the resources, while YANG is used to model both configuration and state data of the resources.

In response to receiving the monitoring objects in telemetry configuration information 120, network devices 112 record the subservice metrics specified in the monitoring objects, and report the subservice metrics (labeled as "metrics" 122 in FIG. 1) back to assurance agents 108 in telemetry streams. In an example, the telemetry streams carry subservice metrics 122 in telemetry objects corresponding to the monitoring objects. In turn, assurance agents 108 tag subservice metrics 122 with service tags to indicate which of the subservice metrics are associated with/belong to which of the services, to produce service-tagged subservice metrics 124 (labeled "tagged metrics" in FIG. 1). In other words, assurance agents 108 apply the service tags to the subservice metrics for the services to which the service tags belong. In the example in which subservice metrics 122 are carried in telemetry objects, assurance agents 108 tag the telemetry objects with the service tag to produce service-tagged telemetry objects). Thus, the service tags provide service context to the subservice metrics.

In one embodiment, assurance agents 108 do not perform any specific analysis on the subservice metrics, leaving such analysis to assurance collectors 110 and/or assurance orchestrator 106. In another embodiment, assurance agents 108 perform analysis on subservice metrics 122 as instructed by the heuristic packages, to produce health states of the subservices (e.g., KPIs used as indicators of subservice health states) to which the subservice metrics pertain. Assurance agents 108 provide to assurance collectors 110 service-tagged subservice metrics 124, along with health states of the subservices when computed by the assurance agents. For example, assurance agents 108 provide flows of service-tagged subservice metrics tagged with service tag 1 to indicate service 1 to service 1 collector, and service-tagged subservice metrics tagged with service tag 2 to indicate service 2 to service 2 collector. Assurance agents 108 may also provide service-tagged subservice metrics 124 to assurance orchestrator 106.

Assurance orchestrator 106 operates as a central controller for assurance of the services deployed on service network 113. That is, assurance orchestrator 106 employs "service awareness" to control assurance for the services deployed on service network 113. In this role, assurance orchestrator 106 performs several main operations. First, assurance orchestrator 106 generates, from the service type and the service instance in the definition of each service defined in service configuration information 116, a unique service tag for the service. In an example, the service tag for a given service may be a tuple that includes the service type and the service instance from the definition of the given service. The service tag may be used to distinguish the service to which it pertains from all other services.

Second, assurance orchestrator 106 decomposes the definition of each service defined in service configuration information 116 into a respective subservice dependency graph of sub services and dependencies/interdependencies between the sub services that collectively (actually) implement the service on a network. That is, assurance orchestrator 106 dissects each service into the respective subservice dependency graph. The subservice dependency graph includes (subservice) nodes that represent the subservices and links between the nodes that represent the dependencies between the subservices. The subservice dependency graph may include the service type and the service instance (e.g., the service tag) for the service represented by the subservice dependency graph. To assist with the aforementioned decomposition, assurance orchestrator 106 may poll or query various network devices identified in the definition to discover sub services, such as packet routing protocols, implemented on the network devices and that are to be incorporated into the subservice dependency graph.

In a non-limiting embodiment, the sub service dependency graph includes a sub service dependency tree having a root node that represents the services, and nodes that represent the sub services and that have parent-child relationships (i.e., the dependencies) between the nodes/subservices that lead back to the root node. Other types of graph constructs/data structures may be used to represent the subservice dependency graph, as would be appreciated by one of ordinary skill in the art having read the present application.

Third, assurance orchestrator 106 derives from each subservice dependency graph a respective set of heuristic packages for the service described by the subservice dependency graph. The heuristic packages (i) specify/define service-related metrics (i.e., subservice metrics) to be monitored/recorded and reported by the sub services, and that are indicative of health statuses/states of the subservices, i.e., that are indicators of health states of the subservices, (ii) include rules to determine/compute key performance (KPIs) including the health states of the subservices (also referred to individually as a "subservice health state," and collectively as "subservice health states") based on the subservice metrics as recorded and reported, and (iii) which sensor paths (i.e., telemetry paths) are to be enabled for reporting telemetry, i.e., to report the subservice metrics recorded by the subservices from the subservices. The heuristic packages may also include or be associated with the service tag for the service to which the heuristic packages correspond. Assurance orchestrator 106 employs the heuristic packages to configure assurance agents 108 to monitor the subservices of the services, and to compute the health states of the subservices based on the monitoring, as described below.

Fourth, assurance orchestrator 106 provides to assurance agents 108 assurance agent configuration information 118 including the heuristic packages and their corresponding service tags in association with each other. Assurance orchestrator 106 may employ NETCONF to push the heuristic packages as YANG objects to assurance agents 108. Assurance orchestrator 106 may also provide the sub service dependency graphs to assurance collectors 110 in assurance collector configuration information 119.

Assurance agents 108 act as intermediary assurance devices between network devices 112, assurance collectors 110, and assurance orchestrator 106. More specifically, assurance agents 108 translate assurance agent configuration information 118, including the heuristic packages, to telemetry configuration information 120, and provide the telemetry configuration information to network devices 112, to configure the network devices 112 to record and report the sub service metrics mentioned above. For example, assurance agents 108 generate monitoring objects that define the subservice metrics to be recorded and reported by the subservices, and provide the monitoring objects to the subservices in telemetry configuration information 120, to configure the subservices to record and report the subservice metrics. Assurance agents 108 may maintain associations/bindings or mappings between the heuristic packages, the monitoring objects generated by the heuristic packages, and the services (e.g., service tags) to which the heuristic packages and the monitoring objects pertain. Assurance agents 108 may employ NETCONF (or RESTCONF), for example, to push YANG monitoring objects to network devices 112.

In response to receiving the monitoring objects in telemetry configuration information 120, network devices 112 record the subservice metrics specified in the monitoring objects, and report the subservice metrics (labeled as "metrics" 122 in FIG. 1) back to assurance agents 108 in telemetry streams. In an example, the telemetry streams carry sub service metrics 122 in telemetry objects corresponding to the monitoring objects. In turn, assurance agents 108 tag subservice metrics 122 with service tags to indicate which of the subservice metrics are associated with/belong to which of the services, to produce service-tagged sub service metrics 124 (labeled "tagged metrics" in FIG. 1). In other words, assurance agents 108 apply the service tags to the subservice metrics for the services to which the service tags belong. In the example in which subservice metrics 122 are carried in telemetry objects, assurance agents 108 tag the telemetry objects with the service tag to produce service-tagged telemetry objects). Thus, the service tags provide service context to the sub service metrics.

Figure 2:
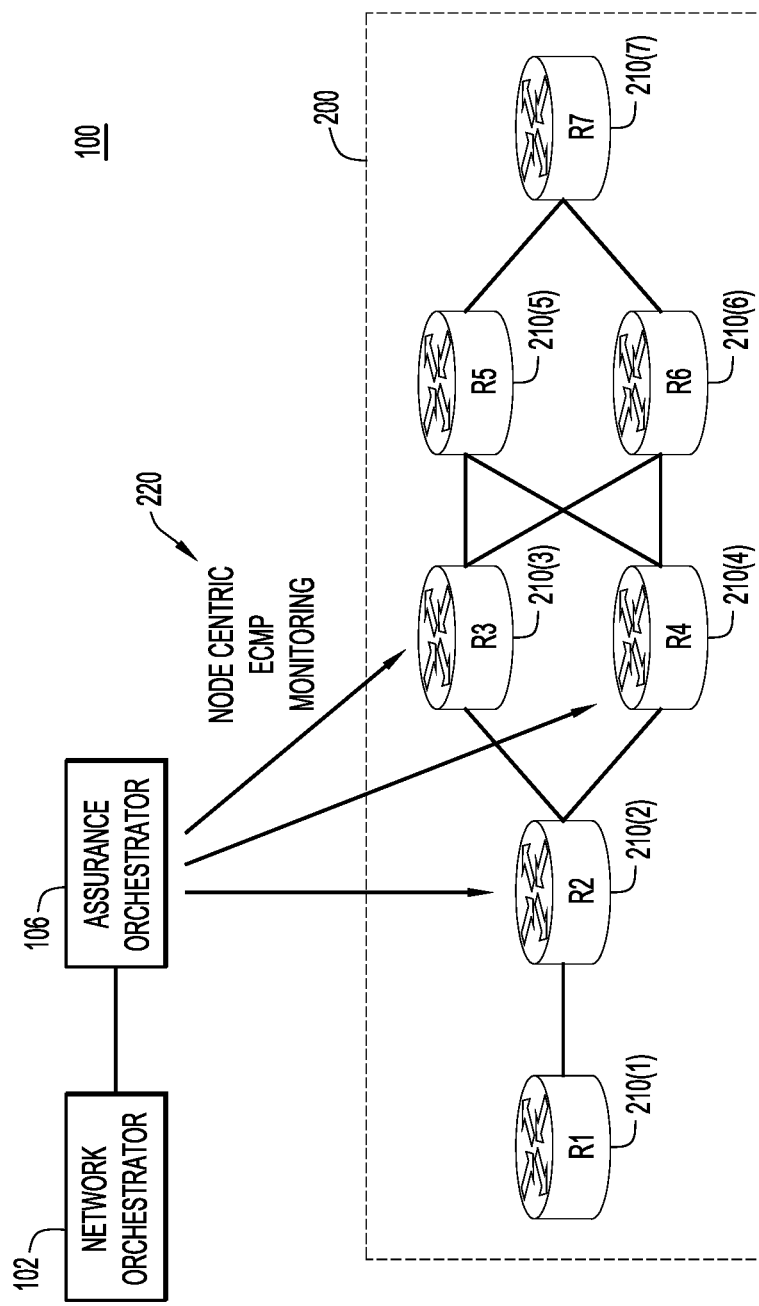
FIG. 2 is a high level block diagram of the system of FIG. 1 configured to determine the performance health of Equal Cost Multi-Path (ECMP) in a network, according to an example embodiment.

Turning to FIG. 2, a diagram is shown of assurance system 100, with a focus on performing assurance of ECMP in a network 200, and in particular for performing node-centric ECMP monitoring, according to the embodiments presented herein. The network 200, in this example, includes nodes R1, R2, R3, R4, R5, R6 and R7, denoted by the reference numerals 210(1)-210(7), respectively. The assurance orchestrator 106, based on network configuration and topology information obtained from the network orchestrator 102, identifies each node with ECMP paths for a service in the network 200. In the network 200, this corresponds to nodes R2, R3 and R4. R2, R3 and R4 are also referred to as ECMP branch nodes, or simply branch nodes.

As shown at 220, the assurance orchestrator 106 instructs the assurance agents 108(2)-180(4) associated with nodes R2, R3 and R4 to configure nodes R2, R3 and R4 to perform node centric monitoring. It should also be understood that the assurance orchestrator may instruct transit nodes (e.g., nodes other than branch nodes R2, R3 and R4), such as nodes R5 and R6 to assist in computing a list of links that are part of ECMP in the network 200 to enable monitoring of ECMP performance if Layer 2 and Layer 3 operations in the network 200.

ECMP functional health can further be viewed in two ways:
1. Healthy forwarding. All the ECMP links are working fine without black/brown out failures.
2. Healthy load distribution. Even distribution of workload to all ECMP paths.

Thus, there are two phases of node-centric ECMP monitoring:
Phase 1—Local statistics are gathered and analyzed to verify healthy forwarding.
Phase 2—Local statistics in combination with monitoring are performed to verify health forwarding and load distribution.

Each node performing ECMP, e.g., nodes R2, R3 and R4 in the network 200 shown in FIG. 2, measures the ECMP paths based on cross-layer, multi-dimensional node-level factors, including:
1. List of interfaces to reach each prefix.
2. Interface status, interface errors, interface load for each interface.
3. Real-time flow-based telemetry data (e.g., Flexible NetFlow™) on a prefix or label basis.
4. Stability of the interface.

The measurement information is published as telemetry data, as shown in FIG. 1.

The assurance orchestrator 106 provides a heuristic rule (s) that defines one or more thresholds or criteria the measurement information is to be evaluated against to ascertain the health of ECMP on the node. This heuristic rule may depend on a variety of factors, including how many egress interfaces there are on the node, etc. Statistics are aggregated for each prefix or label and compared to a threshold.

The real-time flow-based telemetry data involves a capture of packet flow information for a period of time, such as several seconds, and is used to determine whether there is equal load sharing among the egress interfaces of the node. If the load distribution is out of balance across two or more interfaces, then this indicates there is a problem with ECMP load sharing.

The assurance agents 108(2)-108(4) respond to an ECMP health command from the assurance orchestrator 106 and interact with their associated nodes to obtain the desired data from the node from ECMP assurance. In one example, this data may be obtained via a Command Line Interface (CLI) command in the node, such as: "show ecmp {prefix|label}<value>". The data obtained from the node may be published by the assurance agent to any listening collector and/or to the assurance orchestrator 106.

Figure 3:
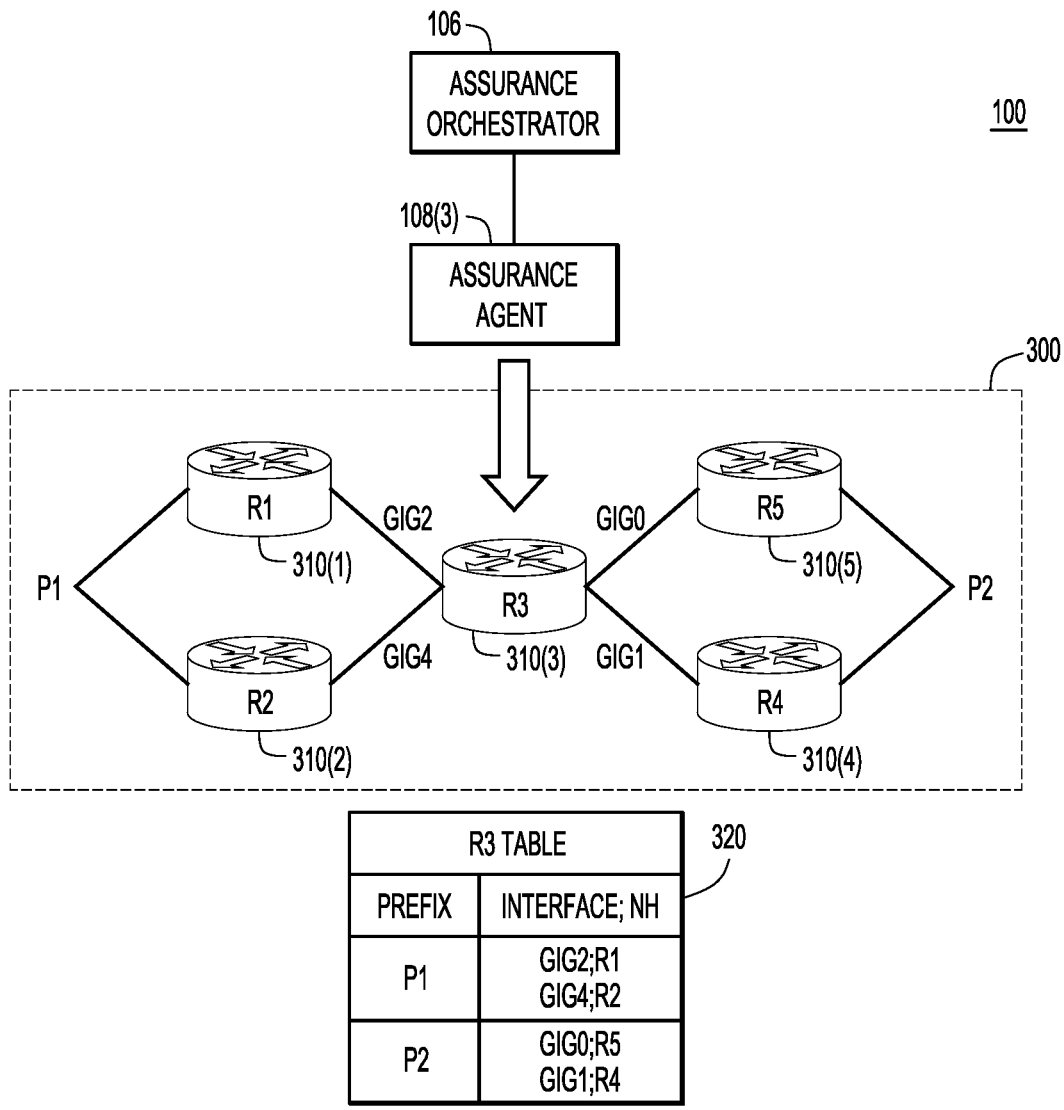
FIG. 3 is a block diagram showing interactions with a branch node in a network to configure the branch node to report on ECMP performance metrics, according to an example embodiment.

Reference is now made to FIG. 3. FIG. 3 shows still another example application of system 100 with a network 300 that includes nodes R1, R2, R3, R4 and R5 shown at 310(1)-310(5). Node R3 is an ECMP branch node that performs ECMP routing to prefixes P1 and P2. As shown in the routing table 320 for node R3, prefix P1 can be reached via node R1 by egress interface Gig2 of node R3, or via node R2 by egress interface Gig4 of node R3. Similarly, prefix P2 can be reached via node R5 via egress interface Gig0 of node R3, or via node R4 via egress interface Gig1 of node R3.

ECMP Node-Level Metrics

The assurance orchestrator 106 may configure an assurance agent of a node, e.g., assurance agent 108(3) of node R3, to obtain ECMP node-level metrics, for any prefix P with ECMP interfaces, such as:
a. Uptime of the Prefix—Indicative of stability of the prefix.
b. Last-Change—Indicative of stability of ECMP (interface added/deleted).
c. Max_path_configured—Maximum paths configured on the node.
d. Max_path_available—Count of ECMP interfaces currently in the table.
e. Router Information Base (RIB) Consistency—Whether RIB is consistent with the ECMP interfaces as per protocol.
f. Forwarding Information Base (FIB) Consistency—Whether FIB is consistent with the ECMP interfaces as per RIB.
g. Label Forwarding Information Base (LFIB) Consistency—Whether incoming label for Prefix P is consistent with the ECMP interfaces.
h. Hardware (HW)-Consistency—Whether ASIC programming is consistent with RIB/FIB.
i. Data Plane Monitoring (DPM)-enabled?—Whether Operation, Administrator and Management (OAM) functionality, such as DPM, is enabled for the Prefix/Label.

Stability of an ECMP interface may be reflected by how long since it was last changed (last-change). If last-change is several days, that indicates good stability. If last-change is seconds or minutes, that indicates instability.

Max_path_configured can indicate ECMP health. For example, a minimum of 4 ECMP paths is healthy, but equal or less than 4 ECMP paths is unhealthy). In general, there could be as many as 54 ECMP paths configured on a node.

RIB/FIB/LFIB consistency involves a check to be sure the control plane is consistent with the data plane on the node.

Thus, RIB/FIB/LFIB consistency is useful to determine whether the ECMP interfaces are configured consistently in the various tables, on linecards, etc.

DPM may be used to determine whether the node can forward to all of the ECMP paths with different entropy.

All of these ECMP node-level metrics are published as ECMP health on the node.

ECMP Flow-Level Metrics

For any Prefix P with ECMP interfaces in a multi-protocol label switching (MPLS) network, real-time packet flow capturing may be triggered for a couple of seconds (or some other configurable period of time) and the statistics can be displayed, such as number of flows on each ECMP interface (% of distribution at the packet flow level).

ECMP Interface-Level Metrics

For each ECMP interface on a node, the following metrics/statistics may be obtained:
 a. Type—Physical or virtual (Switch Virtual Interface (SVI) or PortChannel).
 b. Uptime of the interface—Indicative of stability of the interface.
 c. Last-Change—Indicative of stability of the interface in the ECMP (interface added/deleted).
 d. Statistics—All interface counters.
 e. Maximum Transmission Unit—MTU of the interface. MTU refers to the size (in bytes) of the largest packet that a given layer of a communications protocol can pass onwards.
 f. Packets switched—Packet switched over the interface for a given prefix or label.
 g. Bfd_enabled?—Whether Bidirectional Forwarding Detection (BFD) is enabled for the interface.
 h. Bfd_status—Status of the BFD if enabled.
 i. Egress_policy?—Whether any policy (such as policing) is enabled on the interface, as may be useful for Software-Defined Wide Area Networking (SD-WAN) applications.

ECMP Link-Level Metrics

For each virtual ECMP interface on the node, the following metrics may be obtained:
 a. Type—SVI or PortChannel
 b. List of all links.
 c. Uptime of each link.
 d. Last-change time for each link.
 e. Statistics from each link.
 f. Packets switched.
 g. Micro_Bfd enabled.

Computing ECMP Health

The assurance orchestrator 106 (or assurance agent for a given node) aggregates and analyzes all of the metrics to determine the ECMP performance health of the node. For example, a check is made to be sure all interface characteristics match appropriate/expected values (or within acceptable thresholds), whether there are any errors or packet drops, etc. In addition, a determination is made as to whether there is any single point of failure on the node (such as all ports on the same linecard). A determination is also made as to whether there is equal load distribution among the links/paths. Further still, a determination is made about the health of an ECMP path or link.

Monitoring and Local Statistics

In addition to all the above local ECMP node statistics/metrics, the node will perform DPM validation to detect flow polarization. Flow polarization is possible when entropy keys are not readable, or when the node is incorrectly executing Readable Label Depth (RLD). Furthermore, flow polarization is possible when the node incorrectly executes the ECMP hashing algorithm.

The entropy of a packet flow are key values derived from different features of a packet flow, and may include Source IP address, Destination IP address, transport (e.g., UDP) source port, transport destination port, or combination with labels, etc. Different nodes consider different types of entropy.

The ECMP hashing computation performed by a node involves the node using a local hash value that it mixes in to the computation with the entropy values to apply a bucketing system, where each egress interface is assigned a different bucket.

Sometimes a node cannot read the entropy properly (due to a software bug), and when that happens, the node may direct all the flows to one interface even though there are multiple ECMP interfaces. This is the aforementioned flow polarization.

RLD is how deep into the label stack of a packet a node can read. A node should be able to read deep enough into the label stack in order to get to and read the entropy it needs for the ECMP hash computation. Otherwise, all the packets will look the same (based on labels higher in the stack) to the node and the node will send the packet flows to the same interface.

Accordingly, DPM or Label Switch Router (LSR) self-test techniques are leveraged. A probe packet is generated and the probe packet includes a label stack based on a RLD to be tested; relevant entropy (inner/outer header); and data plane (probe packet-based) signaling to identify the flow/path details.

For DPM, probe packets are generated that have different entropy, and the probe packets are forwarded to previous hop node with respect to the node under test, which returns the probe packets to the node under test, and then the node under test forwards the probe packet to the next hop node. The probe packets should go to the next hop nodes on the different interfaces if the node under text is doing ECMP correctly. If the different probe packets go to the same next hop nodes, then this indicates that the RLD and ECMP not working correctly for load balancing. The resulting data from the probe packets is published in order to enable the assurance orchestrator 106 (or assurance agent 108(3)) determine ECMP health.

A packet flow capture mechanism, such as NetFlow, or immediate export of data in an in-situ Operations Administration and Management (iOAM) header, or other inband or out-of-band technique may be employed.

Figure 4:
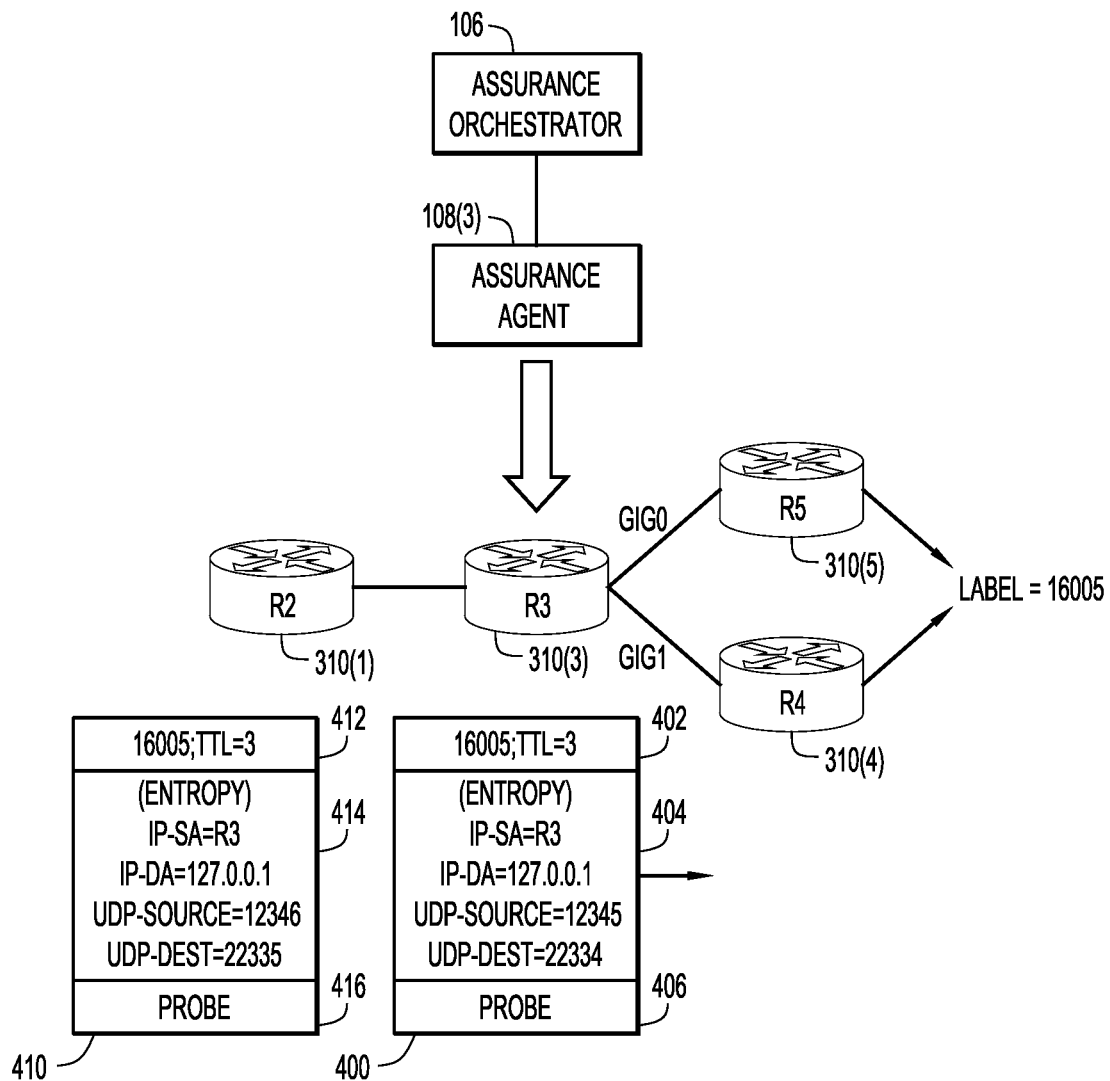
FIGS. 4 and 5 are block diagrams showing interactions with a branch node in a network to configure the branch node to perform flow monitoring and report on ECMP load distribution performance, according to an example embodiment.

Reference is now made to FIG. 4. FIG. 4 illustrates system 100 configured to perform flow monitoring to measure ECPM load balancing of node R3. The assurance orchestrator 106, via assurance agent 108(3), triggers node R3 to generate probe packets based on its local hashing algorithm. For example, when the hashing algorithm is "dpi l2vpn-mac", node R3 is triggered to create probe packets with a varying media access control (MAC) addresses in its inner header. In another example, when the hashing algorithm is "dpi tunnel-ipinip", node R3 is triggered to create different probe packets with varying IP addresses in the inner header.

In the example of FIG. 4, node R3 is triggered to generate probe packets to validate ECMP paths towards label 16005. Based on the local hashing algorithm that node R3 uses, it generates different probe packets with varying UDP source/destination ports, leaving the other variables constant. When an entropy label is supported, node R3 can insert varying entropy label in the probe packets as well. Thus, for example, as shown in FIG. 4, node R3 generates a first probe packet 400 having a time to live (TTL) value of 3 in label 402, and entropy obtained from an inner header 404 having entropy of:

IP Source Address (IP-SA)=R3
IP Destination Address (IP-DA)=127.0.0.1
User Datagram Protocol Source Port (UDP-Source) =12345
UDP Destination Port (UDP-Dest)=22334
Packet 400 also includes probe content 406.

Node R3 generates a second probe packet 410 having a TTL of 3 in a label 412, and an inner header 414 having entropy of:

IP-SA=R3
IP-DA=127.0.0.1
UDP-Source=12346
UDP-Dest=22335
Packet 410 also includes probe content 416.

Figure 5:
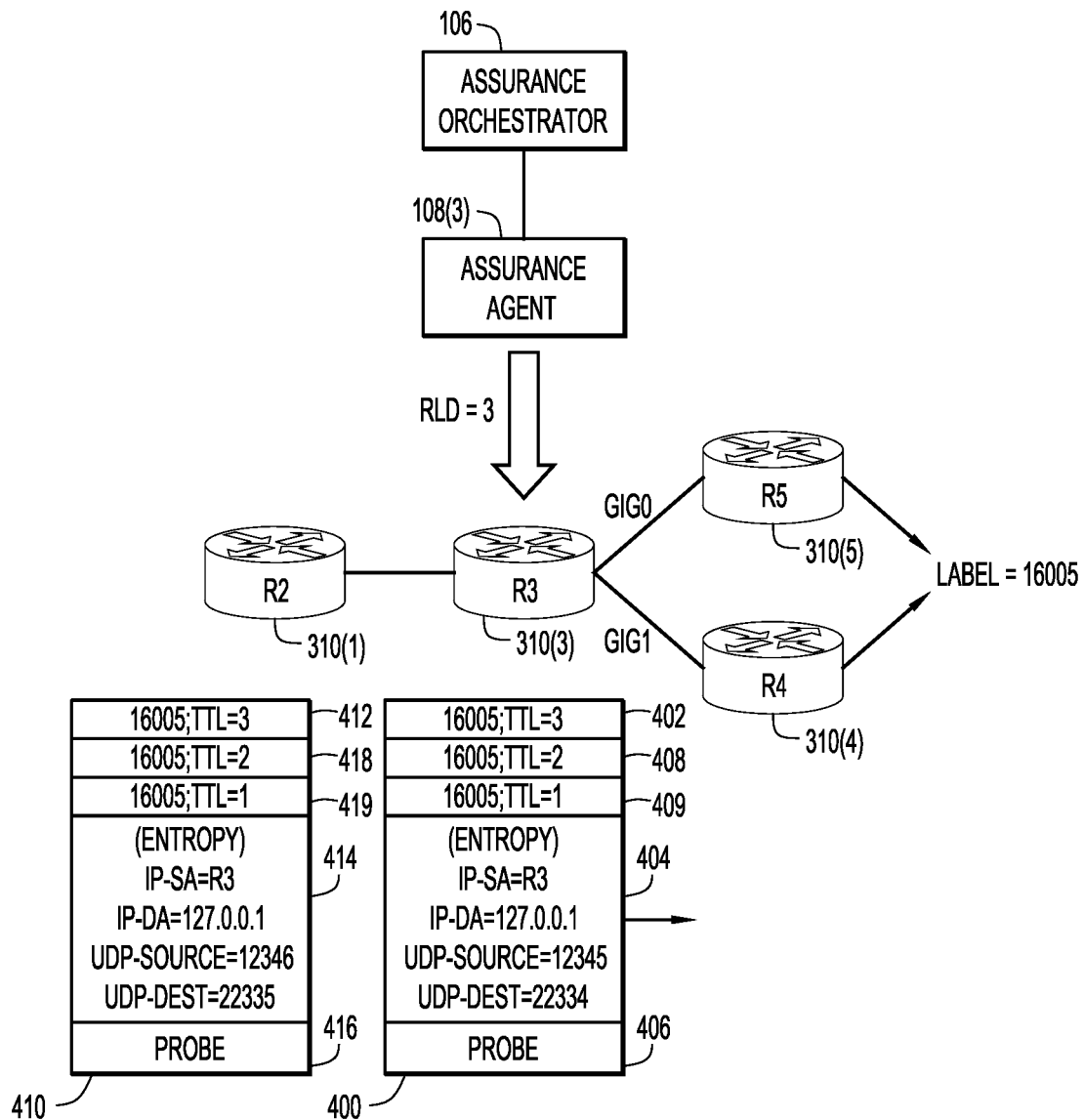

Reference is now made to FIG. 5. FIG. 5 shows the network arrangement of FIG. 4, whereby node R3 has a RLD of 3, and will push additional labels in the stack of the probe packets 400 and 410 to validate the RLD. For example, node R3 will push labels 408 and 409 onto probe packet 400, and labels 418 and 419 onto probe packet 410. The probe packets 400 and 410 are sent with real-time flow capture enabled or using iOAM with immediate export or a loopback bit set. This will create state entries on node R3 for different flows. A selective Flexible NetFlow configuration may be provided to create the NetFlow statistics for selective flows identified with certain parameters (matches based on label or source/destination IP address, etc.)

Node R3 can send multiple flows and check if the flows are load balanced. If the flows are load balanced on the ECMP egress interfaces of node R3, then ECMP load sharing is healthy on node R3. If not, then ECMP load sharing on node R3 is not healthy.

Specific Use Case Example

Figure 6:
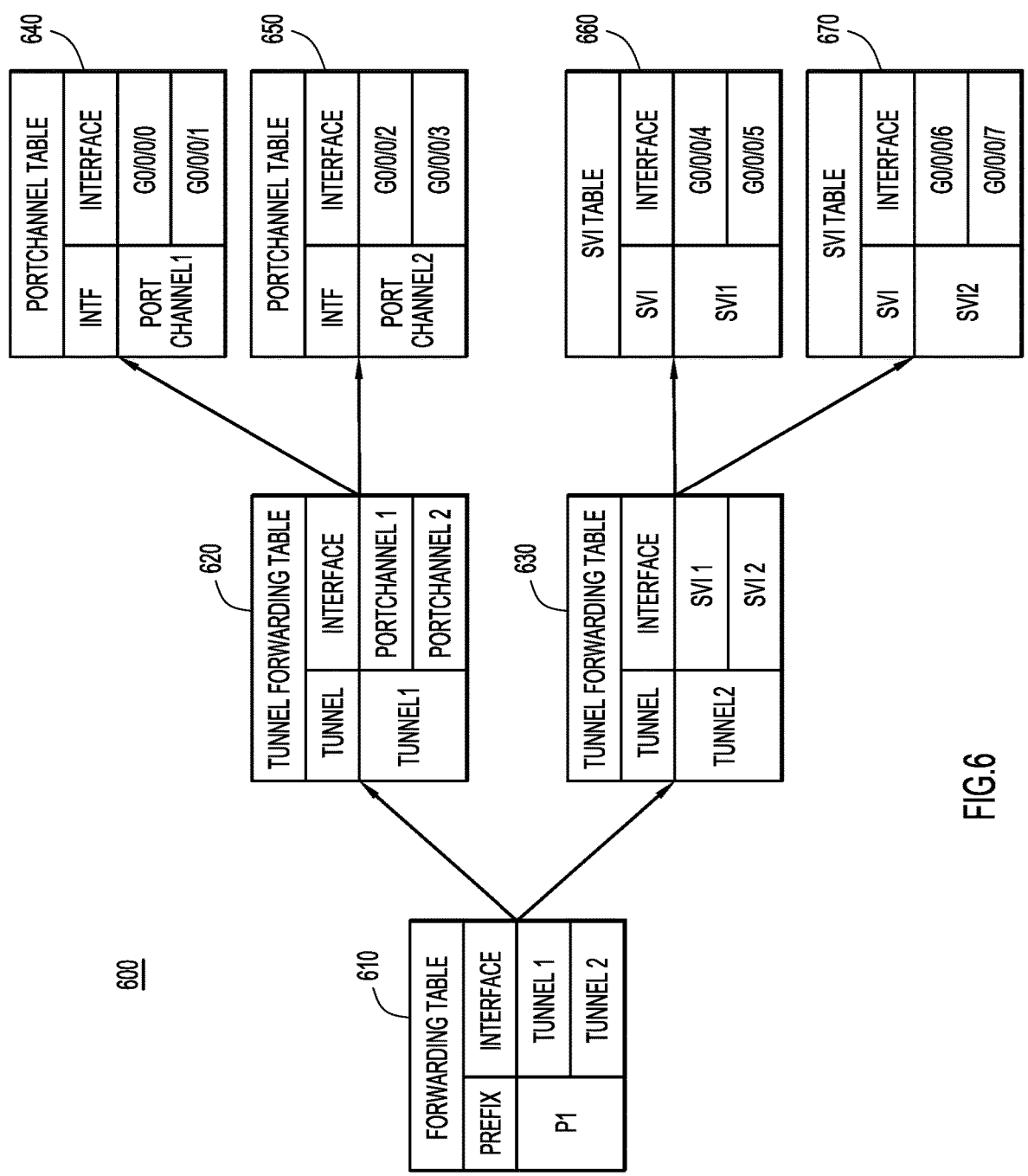
FIG. 6 illustrates an example of decomposing ECMP configured on a branch node across multiple types of interfaces, according to an example embodiment.

Reference is made to FIG. 6 for an example in which ECMP on a given node is evaluated on a per-interface basis. FIG. 6 shows a diagram 600 illustrating that prefix P is reachable via 2 tunnels, Tunnel 1 and Tunnel 2. Based on cross-layer granularity, the list of actual interfaces/links is G0/0/0/0, G0/0/0/1, G0/0/0/2, G0/0/0/3, G0/0/0/4, G0/0/0/5 and G0/0/0/6.

Thus, the link list for prefix P1 is:
prefix_p1_link_list={G0/0/0/0
    G0/0/0/1
    G0/0/0/2
    G0/0/0/3
    G0/0/0/4
    G0/0/0/5
    G0/0/0/6
    G0/0/0/7
}

The node has a forwarding table 610 on the node that indicates that prefix P uses Tunnel 1 and Tunnel 2 as egress interfaces. The node has a first tunnel forwarding table 620 for Tunnel 1. Tunnel forwarding table 620 indicates that Tunnel 1 uses PortChannel 1 and PortChannel 2 as egress interfaces. Similarly, the node has a second tunnel forwarding table 630 that indicates that Tunnel 2 uses SVI 1 and SVI 2 as egress interfaces.

The node further includes two PortChannel tables 640 and 650. Table 640 indicates that PortChannel 1 uses egress interfaces G0/0/0/0 and G0/0/0/1. Table 650 indicates that PortChannel 2 uses egress interfaces G0/0/0/2 and G0/0/0/3.

The node further includes two SVI tables 660 and 670. Table 660 indicates that SVI 1 uses egress interfaces G0/0/0/4 and G0/0/0/5. Table 670 indicates that SVI 2 uses egress interfaces G0/0/0/6 and G0/0/0/7.

Thus, prefix P1 can be forwarded over 1 of 8 interfaces.

Based on the above link list for prefix P1, node level metrics for the prefix may be collected as below:
prefix_p1.Uptime={uptime of the prefix P1 in the table with no change in the ECMP paths listed}
prefix_p1.Consistency={Consistency of Prefix P1 between RIB/FIB/LFIB/HW/etc.}
prefix_p1.frr={disable|available|nobackup}
An aggregate node level ECMP performance metric may be computed:
ecmp_node_metric=fn {
    prefix_p1.Uptime;
    prefix_p1.Consistency;
    prefix_p1.frr;
    . . .
}

The function above can be any algorithm that considers the results of each variable and computes a metric value.

Using the above link information, link/interface level metrics may be collected:
prefix_p1_link_list.Status={Status of all the links)
prefix_p1_link_list.Errors={Errors observed in the stats of each link}
prefix_p1_link_list.Load={Load distribution of traffic on each link}
An aggregate link level ECMP performance metric may be computed:
ecmp_link_metric=fn {
    prefix_p1_link_list.Status;
    prefix_p1_link_list.Errors;
    prefix_p1_link_list.Load;
    . . .
}

The function above can be any algorithm that considers the results of each variable and computes a metric value.

Existing features such as DPM/OAM/SBFD may be used to monitor the forwarding characteristics over each link (for Prefix P or Label L).

An aggregate forwarding ECMP performance metric may be computed. For example, ecmp_fwd_metric=dpm_status.

Figure 7:
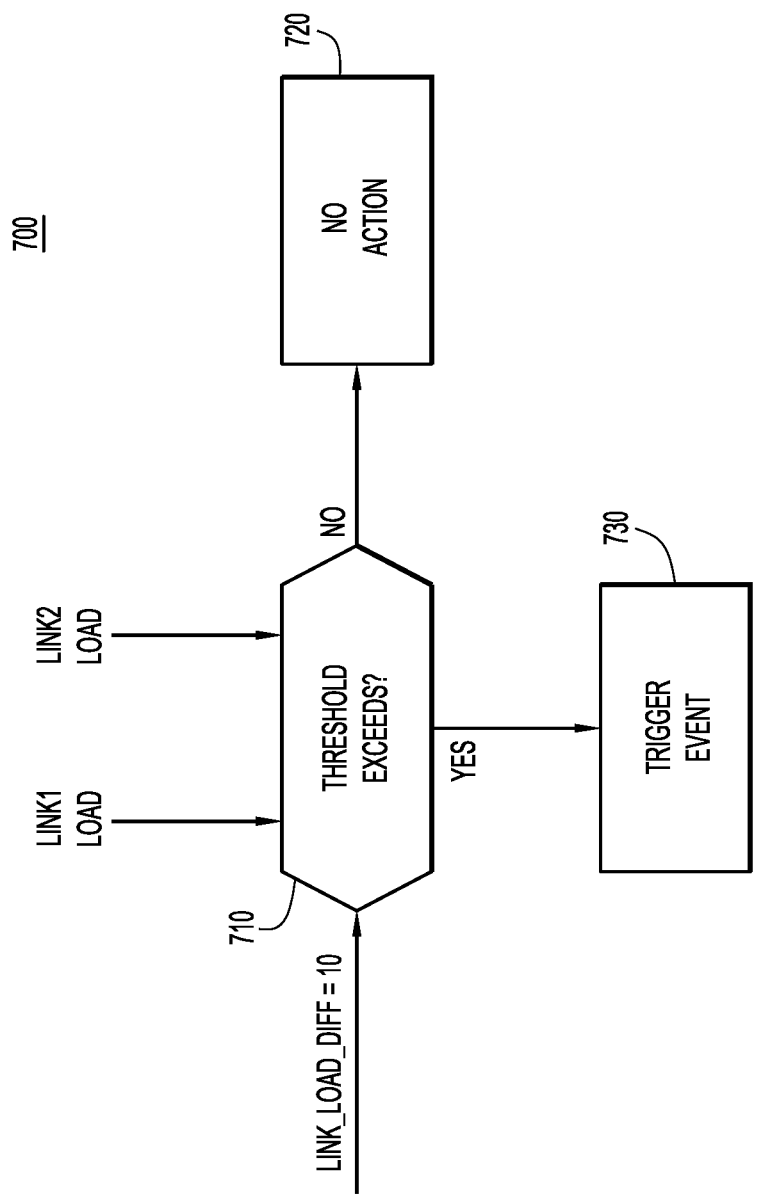
FIG. 7 illustrates an operational flow for event triggering a flow capture for measuring ECMP performance of a branch node, according to an example embodiment.

Reference is made to FIG. 7. FIG. 7 shows an event-triggered real-time flow capture process 700. The link load of two links, Link1 and Link2, is provided to a computation 710 that looks at the difference between the loads of the two links, and determines whether that difference exceeds a difference threshold. When the loads of the links is within a certain threshold difference, no action is required as indicated at 720. If the difference exceeds the threshold, then at 730, an event will trigger real-time flow capturing (e.g., NetFlow, IP Flow Information Export (IPFIX), etc.) for the egress links (at egress direction). The flow information will be used to identify the flow level (not packet level) load-sharing.

Figure 8:
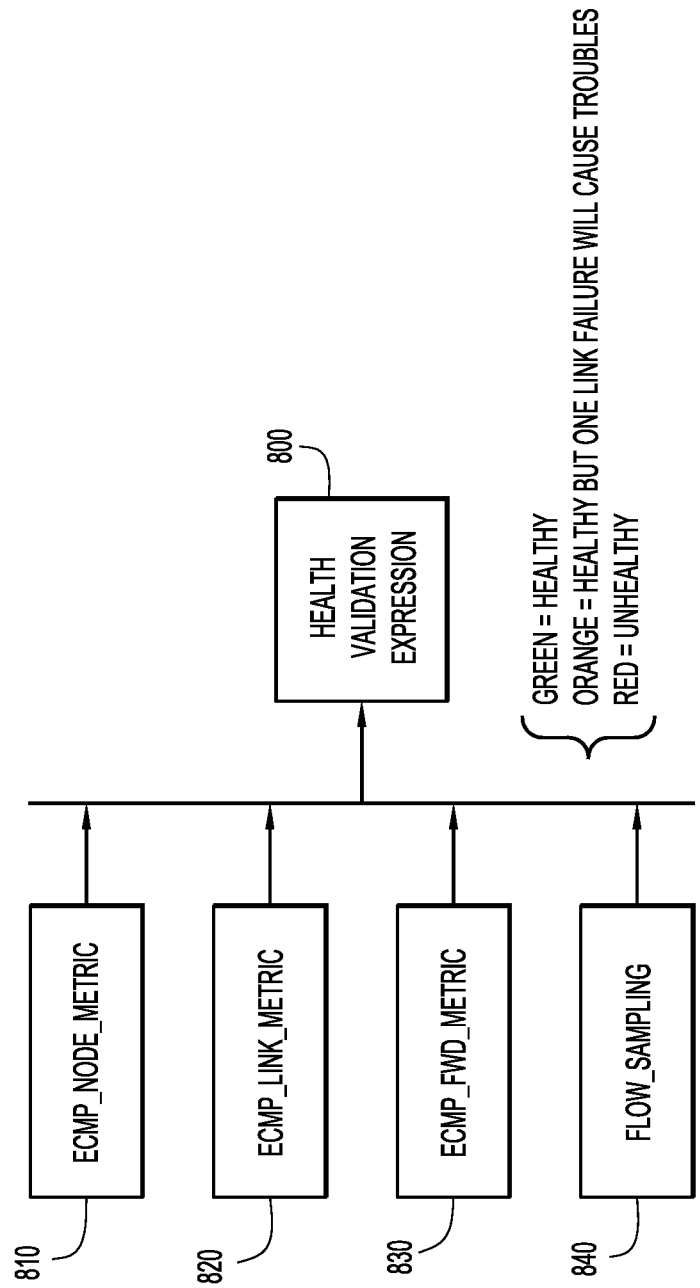
FIG. 8 illustrates an operational flow for computing a measure of ECMP performance health based on a plurality of ECMP performance metrics, according to an example embodiment.

Reference is now made to FIG. 8. FIG. 8 depicts an example of operations that may be performed based on the various ECMP metrics referred to above. A health validation expression 800 may obtain as input various ECMP metrics, such as an ECMP_node_metric 810, ECMP_link_metric 820, ECMP_fwd_metric 830 and flow_sampling data 840. The health validation expression 800 may be a Boolean-type expression that operates on a comparison of the metrics 810, 820 and 830 to respective thresholds as well as a factoring in of intelligence obtained from the flow sampling data 840 to determine a measure of ECMP performance health on a given node. The measure of ECMP performance health may fall into categories, such as:

1. Healthy (Display a Green indicator for the node in a graphical user interface)
2. Healthy but some link failures (Display an Orange indicator for the node in a graphical user interface)
3. Unhealthy (Display a Red indicator for the node in a graphical user interface)

The computations of the ECMP metrics may be made by the assurance agent running on a node or by the assurance orchestrator 106 (see FIGS. 1 and 2).

Consider the following example. In a simplest form, there are two nodes interconnected by more than one direct link. This creates the number of parallel links as an adjacency node metric. Also, there are multiple-paths to reach a given prefix. This can be seen with the express forwarding exact-route commands. An equivalent number can be obtained that is the number of parallel paths for a given prefix destination.

Given these two, there are parallel items (paths, links, tunnels), and the following metrics apply to both cases. On a given member of an ECMP group, performance metrics are tracked, such as drops, delays, round trip time (RTT), etc. This enables determination of individual health on each member (such as whether one link is having a lot of drops while others are not).

On a group basis, metrics can be tracked, such as the number of active members in an ECMP group, and the load of the ECMP group (active traffic divided by capacity). On a link basis, the distribution of traffic is tracked to determine, for example, whether one link is at 100% and the others at 4%. Further still, the number of unique flows per group may be tracked.

Based on the ECMP performance metrics, action that assurance orchestrator may trigger include disabling an ECMP group member. For example, if there is a bad brownout on an ECMP group member, which could affect the entire group, while there can be capacity that can be absorbed elsewhere. As such, shutting down an ECMP group member, re-routing a link or a node, are examples of actions that the assurance orchestrator may trigger based on ECMP performance health determined for a node.

Figure 9:
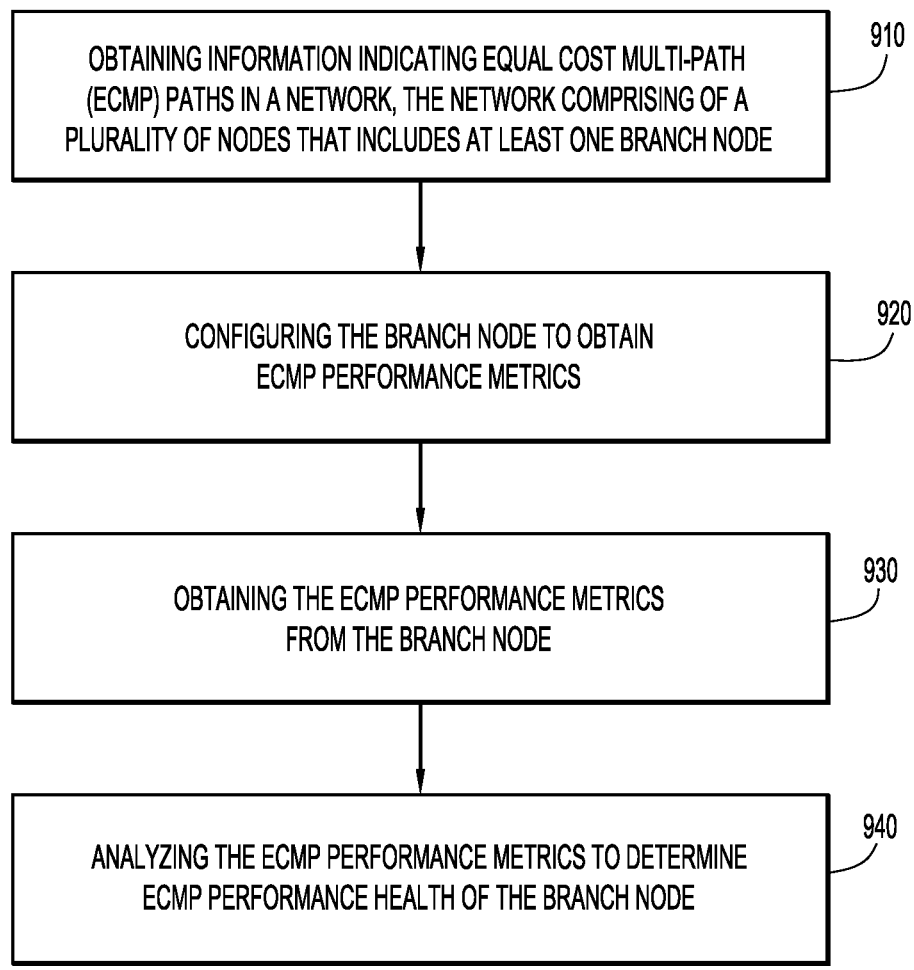
FIG. 9 illustrates a flow chart of method for deriving ECMP performance health of a branch node, according to an example embodiment.

Turning to FIG. 9, a flow chart is shown for a method 900 according to an example embodiment. Method 900 involves determining per-node (node-centric) ECMP performance health. At 910, the method 900 includes obtaining information indicating equal cost multi-path (ECMP) paths in a network. The network comprises a plurality of nodes that includes at least one branch node. At 920, the method 900 involves configuring the branch node in the network to obtain ECMP performance metrics. At 930, the method includes obtaining the ECMP performance metrics from the branch node. At 940, the method involves analyzing the ECMP performance metrics to determine an ECMP performance health of the branch node.

As described above, operation 930 of obtaining the ECMP performance metrics may include obtaining local node metrics and obtaining monitoring metrics. The analyzing operation 940 may be performed based on the local node metrics to determine a measure of forwarding performance, and the analyzing operation 940 may be performed based on the local node metrics and the monitoring metrics to determine a measure of forwarding performance and a measure of load distribution performance. In one form, as described above in connection with FIG. 5, obtaining the monitoring metrics may include obtaining data plane monitoring results from probe packets sent by the branch node, and the analyzing operation 940 may include analyzing the data plane monitoring results. The data plane monitoring results may indicate whether there is one or more of: an incorrect readable label depth on the branch node, incorrect hash algorithm employed by the branch node or incorrect execution of a hash algorithm by the branch node.

The local node metrics may include, for each egress interface of the branch node, one or more of: interface status, interface errors, interface load, and interface stability.

In one form, the local node metrics may include, for a prefix or label with ECMP egress interfaces on the branch node, one or more of: uptime of the prefix or label, time since last change, maximum paths configured, maximum paths available, routing information base consistency with ECMP egress interfaces, forwarding information base consistency with ECMP egress interfaces per the routing information base, label forwarding information base consistency with ECMP egress interfaces, hardware memory programming consistent with routing information base and/or forwarding information base, data plane monitoring enabled for the prefix/label.

In still another form, the local node metrics include, for a prefix or label with ECMP egress interfaces on the branch node: real-time flow data collected for a period of time.

In yet another form, the local network metrics include, for each ECMP egress interface, one or more of: type including physical or virtual, uptime, time since last change, counter statistics, maximum transmission unit, number of packets switched for a prefix or a label, whether bidirectional forwarding detection is enabled, whether an egress policy is enabled.

In still another form, the local node metrics include, for each virtual interface configured on the branch node, one or more of: type of virtual interface, list of all links for each virtual interface, uptime of each link for each virtual interface, statistics from each link, number of packets switched, whether micro bidirectional forwarding detection is enabled.

In one example, the analyzing operation 940 may include evaluating one or more of: metrics associated with egress interfaces on each branch node, error statistics, load distribution among links/paths, whether a branch node has a single point of failure.

As described above in connection with FIG. 8, the ECMP performance metrics may include an aggregate node level ECMP performance metric based on a plurality of node level metrics for a given prefix or label, an aggregate link level ECMP performance metric based on a plurality of link level metrics, an aggregate forwarding ECMP performance metric based on the monitoring metrics, and flow sampling data. The analyzing operation 940 may include computing a measure of ECMP performance health using an expression that combines comparison results of the aggregate node level ECMP performance metric, the aggregate link level ECMP performance metric, and the aggregate forwarding ECMP performance metric with respective thresholds, and with knowledge obtained from the flow sampling data.

In addition, the configuring operation 920 may further include configuring one or more transit nodes in the network to compute a list of links that are part of ECMP in the network for monitoring ECMP performance health of Layer 2 and Layer 3 operations in the network.

Figure 10:
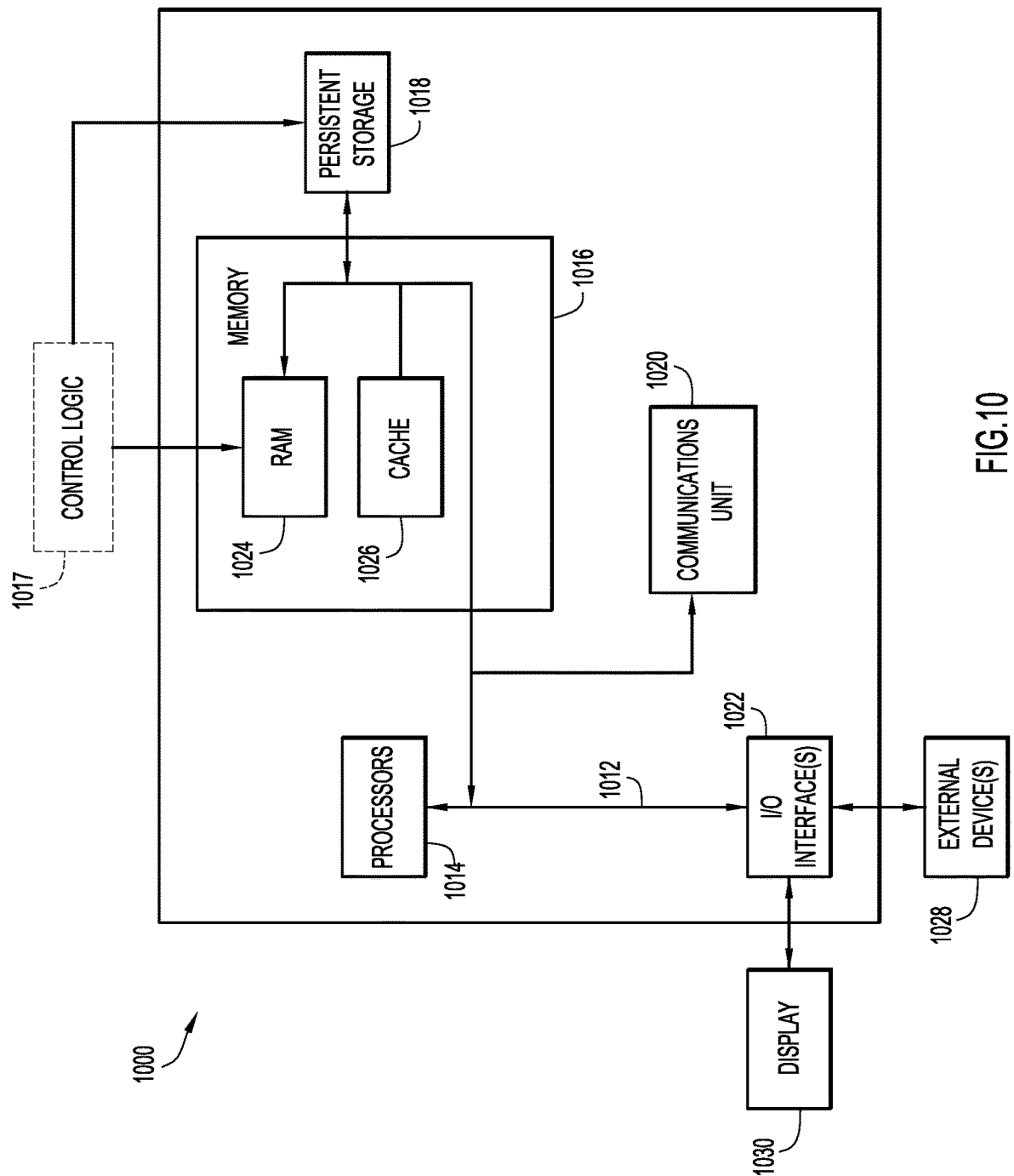
FIG. 10 is a block diagram of a computing device configured to perform the operations presented herein, according to an example embodiment.

FIG. 10 illustrates a hardware block diagram of a computing device 1000 that may perform functions of the assurance orchestrator 106 and/or assurance agents 108, described above in connection with FIGS. 1-9. It should be appreciated that FIG. 10 provides only an illustration of one embodiment and does not imply any limitations with regard to the environments in which different embodiments may be implemented. Many modifications to the depicted environment may be made.

As depicted, the device 1000 includes a bus 1012, which provides communications between computer processor(s) 1014, memory 1016, persistent storage 1018, communications unit 1020, and input/output (I/O) interface(s) 1022. Bus 1012 can be implemented with any architecture designed for passing data and/or control information between processors (such as microprocessors, communications and network processors, etc.), system memory, peripheral devices, and any other hardware components within a system. For example, bus 1012 can be implemented with one or more buses.

Memory 1016 and persistent storage 1018 are computer readable storage media. In the depicted embodiment, memory 1016 includes random access memory (RAM) 1024 and cache memory 1026. In general, memory 1016 can include any suitable volatile or non-volatile computer readable storage media. Instructions for the control logic 1017 that controls and performs operations of the assurance orchestrator 106 and/or assurance agents 108, may be stored in memory 1016 or persistent storage 1018 for execution by processor(s) 1014.

One or more programs may be stored in persistent storage 1018 for execution by one or more of the respective computer processors 1014 via one or more memories of memory 1016. The persistent storage 1018 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 1018 may also be removable. For example, a removable hard drive may be used for persistent storage 1018. Other examples include optical and magnetic disks, thumb drives, and smart cards that are inserted into a drive for transfer onto another computer readable storage medium that is also part of persistent storage 1018.

Communications unit 1020, in these examples, provides for communications with other data processing systems or devices. In these examples, communications unit 1020 includes one or more network interface cards. Communications unit 1020 may provide communications through the use of either or both physical and wireless communications links.

I/O interface(s) 1022 allows for input and output of data with other devices that may be connected to computer device 1000. For example, I/O interface 1022 may provide a connection to external devices 1028 such as a keyboard, keypad, a touch screen, and/or some other suitable input device. External devices 1028 can also include portable computer readable storage media such as database systems, thumb drives, portable optical or magnetic disks, and memory cards.

Software and data used to practice embodiments can be stored on such portable computer readable storage media and can be loaded onto persistent storage 1018 via I/O interface(s) 1022. I/O interface(s) 1022 may also connect to a display 1030. Display 1030 provides a mechanism to display data to a user and may be, for example, a computer monitor.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information (e.g., data relating to scraping network sites), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardware, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. The database system may be included within or coupled to the server and/or client systems. The database systems and/or storage structures may be remote from or local to the computer or other processing systems, and may store any desired data.

The present embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As described herein, techniques are provided to determine a measure of ECMP performance health of a node. In one form, for each of the monitored prefix (or label), ECMP health is monitored by: identifying the list of all ECMP interfaces based on cross-layer and cross-dimensional granularity; monitoring Node-level factors for ECMP health, stability of an ECMP entry (without any change), RIB/FIB/LFIB consistency, maximum path, interface-level factors for ECMP health including uptime and statistics from L3 interfaces (physical and virtual), link-level factors for ECMP health including uptime and statistics from L2 links including forwarding ability over each such link. Moreover, Data Plane Monitoring (DPM), IP Service Level Agreement (IPSLA) status is monitored. Load distribution over ECMP paths is monitored using a variety of techniques. Flow sampling-based techniques (FNF/IPFIX statistics) are used for the prefix or label being monitored. The cumulative load on each of the egress interfaces is monitored within the ECMP path, as well as the cumulative load statistics from all interfaces. All the above information is leveraged to compute an ECMP health index or measure of ECMP performance for a node.

In summary, methods are provided herein for propose the concept of node-centric ECMP health measuring technique with service awareness. An assurance orchestrator leverages the service and topology visibility to identify the node with ECMP paths and the prefix to be monitored. Transit node instructed by the assurance orchestrator computes the list of links (that are part of ECMP) to be monitored across layers (L2/L3) and measure the health of each the links from different dimensions (status, forwarding ability, load distribution, etc.). This is used to provide a holistic view of the ECMP health on a per-prefix basis and ensure that the ECMP path is healthy and the load is distributed among the available ECMP paths. The health information is used by an assurance orchestrator for end-to-end service assurance, by sending configuration changes for ECMP on ECMP branch nodes.

In one form, a method is provided including: obtaining information indicating equal cost multi-path (ECMP) paths in a network, the network comprising a plurality of nodes that includes at least one branch node; configuring the branch node to obtain ECMP performance metrics; obtaining the ECMP performance metrics from the branch node; and analyzing the ECMP performance metrics to determine ECMP performance health of the branch node.

In another form, an apparatus is provided comprising: a communication interface configured to enable communication with one or more of a plurality of nodes in a network; and a processor coupled to the communication interface, wherein the processor is configured to perform operations including: obtaining information indicating equal cost multi-path (ECMP) paths in the network, the network including at least one branch node; configuring the branch node to obtain ECMP performance metrics; obtaining the ECMP performance metrics from the branch node; and analyzing the ECMP performance metrics to determine ECMP performance health of the branch node.

In still another form, one or more non-transitory computer readable storage media encoded with instructions, that when executed by a processor, cause the processor to perform operations including: obtaining information indicating equal cost multi-path (ECMP) paths in a network, the network comprising a plurality of nodes that includes at least one branch node; configuring the branch node to obtain ECMP performance metrics; obtaining the ECMP performance metrics from the branch node; and analyzing the ECMP performance metrics to determine ECMP performance health of the branch node.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising at a computer device:
based on network configuration and topology information, identifying one or more branch nodes with equal cost multi-path (ECMP) paths in a network, each ECMP path comprising a plurality of nodes that includes a branch node of the one or more branch nodes, and for each branch node identified by the computer device:
  configuring the branch node to obtain ECMP performance metrics associated with the ECMP path for a particular service among multiple services provided by the network, the configuring including providing, to the branch node, intent-based monitoring objects to configure the branch node to:
    record the ECMP performance metrics; and
    report the ECMP performance metrics in telemetry with a service tag that identifies the particular service;
  based on the configuring, receiving, from the branch node, the ECMP performance metrics with the service tag and including:
    a node level performance metric for the branch node;
    multiple link level performance metrics for respective links associated with the branch node; and
    multiple flow-level metrics with flow information for respective interfaces of the branch node; and
  analyzing the ECMP performance metrics to determine ECMP performance health of the branch node as healthy, healthy with some failures, or unhealthy based on a comparison of the ECMP performance metrics with respective thresholds and information associated with flow sampling data.

2. The method of claim 1, wherein receiving the ECMP performance metrics includes obtaining local node metrics which include the node level performance metric and obtaining monitoring metrics, wherein analyzing is performed based on the local node metrics to determine a measure of forwarding performance and the analyzing is performed based on the local node metrics and the monitoring metrics to determine a measure of forwarding performance and a measure of load distribution performance.

3. The method of claim 2, wherein the local node metrics include, for each egress interface of the branch node, one or more of: interface status, interface errors, interface load, and interface stability.

4. The method of claim 3, wherein the local node metrics include, for a prefix or label with ECMP egress interfaces on the branch node, one or more of: uptime of the prefix or label, time since last change, maximum paths configured, maximum paths available, consistency of a routing information base with ECMP egress interfaces, forwarding information base consistency with ECMP egress interfaces per the routing information base, label forwarding information base consistency with ECMP egress interfaces, hardware memory programming consistent with routing information base and/or forwarding information base, data plane monitoring enabled for the prefix or label.

5. The method of claim 3, wherein the local node metrics include, for a prefix or label with ECMP egress interfaces on the branch node: the multiple flow-level metrics collected for a period of time.

6. The method of claim 3, wherein the local node metrics include, for each ECMP egress interface, one or more of: type including physical or virtual, uptime, time since last change, counter statistics, maximum transmission unit, number of packets switched for a prefix or a label, whether bidirectional forwarding detection is enabled, whether an egress policy is enabled.

7. The method of claim 3, wherein the local node metrics include, for each virtual interface configured on the branch node, one or more of: type of virtual interface, list of all links for each virtual interface, uptime of each link for each virtual interface, statistics from each link, number of packets switched, whether micro bidirectional forwarding detection is enabled.

8. The method of claim 2, wherein analyzing comprises evaluating one or more of: metrics associated with egress interfaces on the branch node, error statistics, load distribution among links/paths, whether the branch node has a single point of failure.

9. The method of claim 2, wherein:
  the obtaining the monitoring metrics includes obtaining data plane monitoring results from probe packets sent by the branch node; and
  the analyzing includes analyzing the data plane monitoring results.

10. The method of claim 9, wherein the data plane monitoring results indicate whether there is one or more of: an incorrect readable label depth on the branch node, incorrect hash algorithm employed by the branch node or incorrect execution of a hash algorithm by the branch node.

11. The method of claim 2, wherein the ECMP performance metrics further include an aggregate node level ECMP performance metric based on a plurality of node level metrics for a given prefix or label, an aggregate link level ECMP performance metric based on a plurality of link level metrics, an aggregate forwarding ECMP performance metric based on the monitoring metrics, and the flow sampling data, and wherein analyzing includes computing a measure of ECMP performance health using an expression that combines comparison results of the aggregate node level ECMP performance metric, the aggregate link level ECMP performance metric, and the aggregate forwarding ECMP performance metric with respective thresholds, and with knowledge obtained from the flow sampling data.

12. The method of claim 1, wherein configuring comprises configuring one or more transit nodes in the network to compute a list of links that are part of ECMP in the network for monitoring ECMP performance health of Layer 2 and Layer 3 operations in the network.

13. An apparatus comprising
  a communication interface configured to enable communication with one or more of a plurality of nodes in a network; and
  a processor coupled to the communication interface, wherein the processor is configured to perform operations including:
  based on network configuration and topology information, identifying one or more branch nodes with equal cost multi-path (ECMP) paths in the network, each ECMP path comprising a plurality of nodes that includes a branch node of the one or more branch nodes, and for each branch node identified:
    configuring the branch node to obtain ECMP performance metrics associated with the ECMP path for a particular service among multiple services provided by the network, the configuring including providing, to the branch node, intent-based monitoring objects to configure the branch node to:
      record the ECMP performance metrics; and
      report the ECMP performance metrics in telemetry with a service tag that identifies the particular service;
    based on the configuring, receiving, from the branch node, the ECMP performance metrics with the service tag and including:
      a node level performance metric for the branch node;

multiple link level performance metrics for respective links associated with the branch node; and
multiple flow-level metrics with flow information for respective interfaces of the branch node; and
analyzing the ECMP performance metrics to determine ECMP performance health of the branch node as healthy, healthy with some failures, or unhealthy based on a comparison of the ECMP performance metrics with respective thresholds and information associated with flow sampling data.

14. The apparatus of claim 13, wherein the processor is configured to perform the receiving the ECMP performance metrics by obtaining local node metrics which include the node level performance metric and obtaining monitoring metrics, and to perform the analyzing based on the local node metrics to determine a measure of forwarding performance and to perform the analyzing based on the local node metrics and the monitoring metrics to determine a measure of forwarding performance and a measure of load distribution performance.

15. The apparatus of claim 14, wherein the processor is configured to perform the analyzing by evaluating one or more of: metrics associated with egress interfaces on the branch node, error statistics, load distribution among links/paths, whether the branch node has a single point of failure.

16. The apparatus of claim 14, wherein the processor is configured to perform the obtaining the monitoring metrics by obtaining data plane monitoring results from probe packets sent by the branch node, and to perform by analyzing by analyzing the data plane monitoring results.

17. The apparatus of claim 13, wherein the processor is configured to perform the configuring for one or more transit nodes in the network to compute a list of links that are part of ECMP in the network for monitoring ECMP performance health of Layer 2 and Layer 3 operations in the network.

18. One or more non-transitory computer readable storage media encoded with instructions, that when executed by a processor, cause the processor to perform operations including:
based on network configuration and topology information, identifying one or more branch nodes with equal cost multi-path (ECMP) paths in a network, each ECMP path comprising a plurality of nodes that includes a branch node of the one or more branch nodes, and for each branch node identified:
configuring the branch node to obtain ECMP performance metrics associated with the ECMP path for a particular service among multiple services provided by the network, the configuring including providing, to the branch node, intent-based monitoring objects to configure the branch node to:
record the ECMP performance metrics; and
report the ECMP performance metrics in telemetry with a service tag that identifies the particular service;
based on the configuring, receiving, from the branch node, the ECMP performance metrics with the service tag and including:
a node level performance metric for the branch node;
multiple link level performance metrics for respective links associated with the branch node; and
multiple flow-level metrics with flow information for respective interfaces of the branch node; and
analyzing the ECMP performance metrics to determine ECMP performance health of the branch node as healthy, healthy with some failures, or unhealthy based on a comparison of the ECMP performance metrics with respective thresholds and information associated with flow sampling data.

19. The one or more non-transitory computer readable storage media of claim 18, wherein the instructions for receiving include instructions for obtaining local node metrics which include the node level performance metric and obtaining monitoring metrics, wherein the instructions for analyzing include instructions for analyzing based on the local node metrics to determine a measure of forwarding performance and for analyzing based on the local node metrics and the monitoring metrics to determine a measure of forwarding performance and a measure of load distribution performance.

20. The one or more non-transitory computer readable storage media of claim 18, wherein the instructions for analyzing include instructions for evaluating one or more of: metrics associated with egress interfaces on the branch node, error statistics, load distribution among links/paths, whether the branch node has a single point of failure.

* * * * *